US012644768B2

(12) United States Patent
    Cao et al.

(10) Patent No.: US 12,644,768 B2
(45) Date of Patent: Jun. 2, 2026

(54) ELECTROMAGNETIC RADIATION MEASUREMENT DEVICE

(71) Applicant: NPL MANAGEMENT LIMITED, Teddington Middlesex (GB)

(72) Inventors: Yameng Cao, Teddington Middlesex (GB); Fernando Castro, Teddington Middlesex (GB); Sebastian Wood, Teddington Middlesex (GB)

(73) Assignee: NPL MANAGEMENT LIMITED, Teddington (GB)

( * ) Notice: Subject to any disclaimer, the term of this patent is extended or adjusted under 35 U.S.C. 154(b) by 162 days.

(21) Appl. No.: 18/722,902

(22) PCT Filed: Dec. 21, 2022

(86) PCT No.: PCT/GB2022/053341
    § 371 (c)(1),
    (2) Date: Jun. 21, 2024

(87) PCT Pub. No.: WO2023/118863
    PCT Pub. Date: Jun. 29, 2023

(65) Prior Publication Data
    US 2025/0102359 A1      Mar. 27, 2025

(30) Foreign Application Priority Data
    Dec. 23, 2021    (GB) ..................................... 2118924

(51) Int. Cl.
    *G01J 3/32*          (2006.01)
    *G01J 3/02*          (2006.01)
    (Continued)

(52) U.S. Cl.
    CPC ........... *G01J 3/2803* (2013.01); *G01J 3/0237* (2013.01); *G01J 3/027* (2013.01); *G01J 3/2823* (2013.01);
    (Continued)

(58) Field of Classification Search
    CPC ........ G01J 3/2803; G01J 3/0237; G01J 3/027; G01J 3/2823; G01J 3/32; G01J 2003/1221;
    (Continued)

(56) References Cited

U.S. PATENT DOCUMENTS

2007/0035818 A1*  2/2007  Bahatt ..................... G01N 21/76
                                                      359/366
2007/0070260 A1*  3/2007  Wang .................. G02F 1/13363
                                                      349/18
    (Continued)

FOREIGN PATENT DOCUMENTS

EP          2730901 A2      5/2014
EP          2730901 A3      6/2014
    (Continued)

OTHER PUBLICATIONS

International Search Report and Written Opinion for PCT Application No. PCT/GB2022/053341, dated Mar. 30, 2023, 6 pages.
    (Continued)

*Primary Examiner* — Abdullahi Nur
(74) *Attorney, Agent, or Firm* — Dickinson Wright PLLC

(57) ABSTRACT

An electromagnetic radiation measurement device is disclosed, including an electromagnetic radiation sensor and a reconfigurable filter assembly. The reconfigurable filter assembly has a series of configurations, each configuration of the series filtering to a different wavelength band for measuring by the sensor. The wavelength bands of adjacent configurations of the series overlap thereby to define differential sub-bands. The device also includes a processor configured to utilise sensor measurements for different configurations of the series to derive measurement values for the sub-bands.

20 Claims, 10 Drawing Sheets

(51) Int. Cl.
*G01J 3/28* (2006.01)
*G01J 3/12* (2006.01)

(52) U.S. Cl.
CPC ......... *G01J 3/32* (2013.01); *G01J 2003/1221* (2013.01); *G01J 2003/1247* (2013.01); *G01J 2003/1269* (2013.01); *G01J 2003/2826* (2013.01)

(58) Field of Classification Search
CPC ....... G01J 2003/1247; G01J 2003/1269; G01J 2003/2826; G01J 2003/1213
See application file for complete search history.

(56) References Cited

U.S. PATENT DOCUMENTS

| | | | | |
|---|---|---|---|---|
| 2011/0216324 A1* | 9/2011 | Arieli | ................. | G02F 1/13336 356/453 |
| 2011/0310475 A1* | 12/2011 | Iketaki | .............. | G02B 21/0068 359/388 |
| 2013/0278933 A1* | 10/2013 | Nozawa | .................... | G01J 3/51 359/578 |
| 2014/0125981 A1* | 5/2014 | Iga | ........................... | G01J 3/51 356/402 |
| 2015/0271380 A1 | 9/2015 | Darty et al. | | |
| 2015/0308896 A1 | 10/2015 | Darty | | |

| | | | | |
|---|---|---|---|---|
| 2016/0097887 A1* | 4/2016 | Jin | ........................ | G01J 1/0448 359/615 |
| 2020/0132277 A1* | 4/2020 | Akkaya | ................ | F21V 14/003 |
| 2020/0378831 A1 | 12/2020 | Hegyi et al. | | |

FOREIGN PATENT DOCUMENTS

| | | | | |
|---|---|---|---|---|
| EP | 2990841 A1 * | 3/2016 | ............... | G01J 3/12 |
| EP | 3306289 A1 | 4/2018 | | |
| WO | WO-2021096648 A1 * | 5/2021 | ........... | G01J 3/2823 |

OTHER PUBLICATIONS

Search Report for British Application No. 2118924.3, dated Apr. 20, 2022, 4 pages.

Pust, "Innovative Filter Solutions for Hyperspectral Imaging," Optik & Photonik, Mar. 2016, 4 pages.

Lu et al., "Medical hyperspectral imaging: a review," Journal of Biomedical Optics, Jan. 2014, 24 pages.

Gao et al., "Acousto-optic supermultispectral imaging," 2219 Applied Optics, Jun. 1993, 6 pages.

Sara et al., "Determining spectral response of a photovoltaic device using polychromatic filters," IET Renewable Power Generation, Jan. 29, 2014, 7 pages, vol. 8, Iss. 5, doi: 10.1049/iet-rpg.2013.0248.

Eichstadt et al., "Comparison of the Richardson-Lucy method and a classical approach for spectrometer bandpass correction," Metrologia, Feb. 8, 2013, 13 pages, vol. 50.

\* cited by examiner

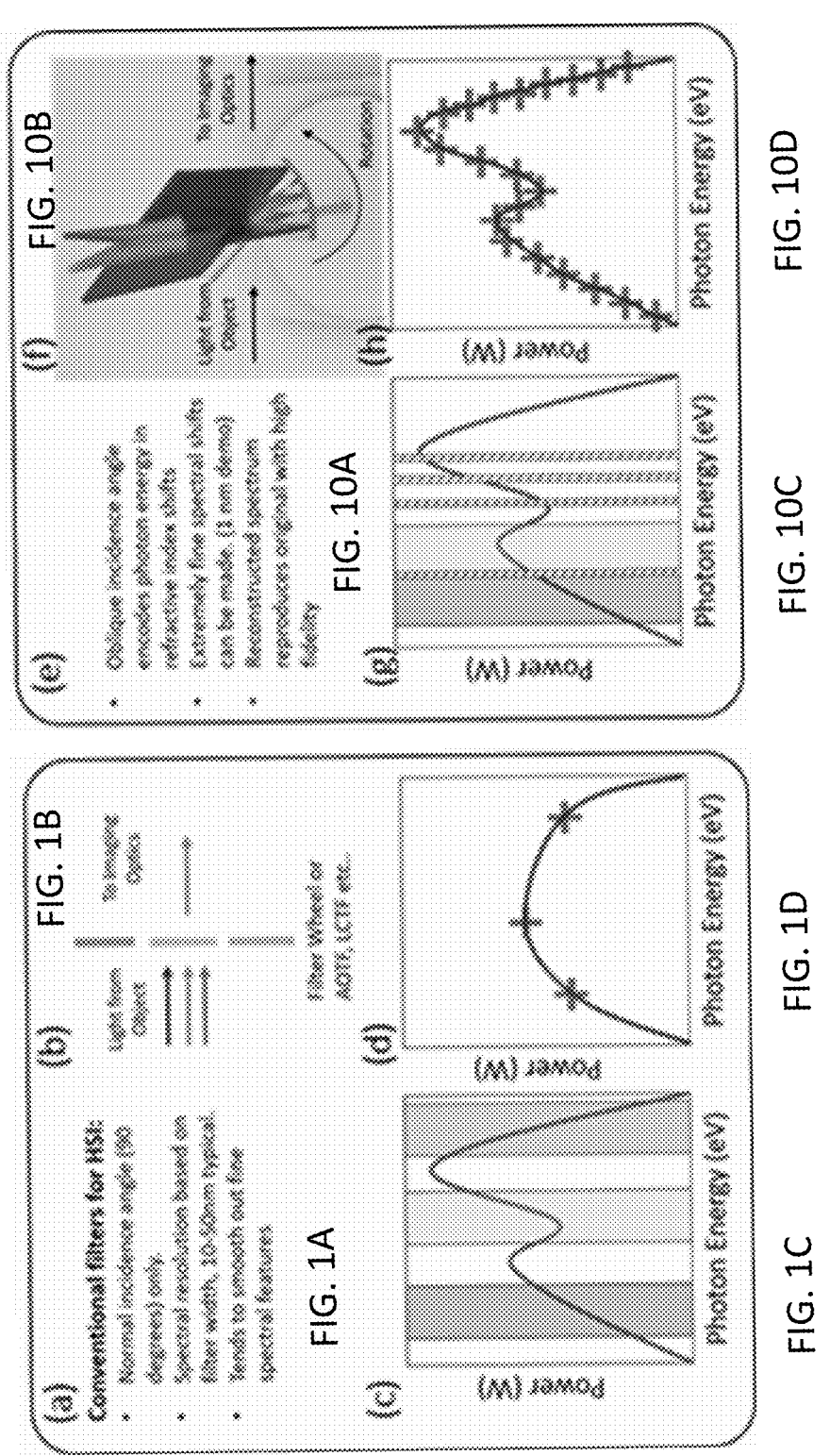

ELECTROMAGNETIC RADIATION MEASUREMENT DEVICE

CROSS-REFERENCE TO RELATED APPLICATION(S)

The present application is a U.S. national phase application of International Patent Application No. PCT/GB2022/053341, filed on Dec. 21, 2022, which claims priority to Great Britain Patent Application No. 2118924.6 filed on Dec. 23, 2021, the disclosures of which are hereby incorporated by reference in their entireties.

TECHNICAL FIELD

This disclosure relates to electromagnetic radiation measurement devices and associated methods

BACKGROUND

Hyperspectral imaging can be used to image a scene and extract spectral detail from it. Conventionally, this can be done using a series of optical bandpass filters to selectively adjust the wavelength band measured. Alternatively, point-by-point or line-by-line spectroscopic measurements can be used and are known as 'whisk broom' or 'push broom' scanners. There are also snapshot imagers that acquire the entire data cube in one measurement. However, these approaches are optically complex, costly, have coupled uncertainties and measurement errors in the spatial and spectral dimensions and typically have long scene acquisition times.

Conventional optical bandpass filter based hyperspectral imaging (HSI) works as follows. Light from a scene contains photons of a mixture of wavelengths (spectral information), an optical bandpass filter placed in front of this scene will transmit a range of wavelengths according to the bandwidth of the filter. To transmit a different wavelength band the filter is changed. Conventional tuneable filters, including thin-film dielectric filters, acousto-optic tuneable filters and liquid-crystal tuneable filters have a bandwidth greater than 3 nm, which determines the spectral resolution achieved in this scheme.

It is also possible to use a grating monochromator as a spectral dispersive system that provides the spectral resolution. This can achieve a higher spectral resolution but significantly compromises the signal to noise ratio.

SUMMARY

Aspects of the present disclosure seek to provide an improved electromagnetic radiation measurement device and method.

According to an aspect of the disclosure, there is provided an electromagnetic radiation measurement device as in claim 1.

According to an aspect of the disclosure, there is provided an electromagnetic radiation measurement device, including:

an electromagnetic radiation sensor;

a reconfigurable filter assembly, the reconfigurable filter assembly having a series of configurations, each configuration of the series allowing transmission of a different wavelength band through the filter assembly to the sensor, the wavelength bands of adjacent configurations of the series overlapping thereby to define differential sub-bands;

a processor configured to utilise sensor measurements for different configurations of the series to derive measurement values for the sub-bands.

Optional features of the aspects above are set out in the dependent claims and/or detailed below.

Exploiting configurations of the filter assembly having overlapping wavelength bands, preferred embodiments are able to extract a greater level of spectral detail than is provided by the configurations in isolation. In particular, preferred embodiments are able to determine measurement values for differential sub-bands which are potentially much narrower than the wavelength bands possible for any individual configuration. This can provide high spectral resolution which can for example be useful in spectroscopy or in imaging for detecting a large number of specific conditions which give rise to specific narrow-band signals or signatures.

As will be appreciated, where the description discusses the wavelength band of a configuration, this is a reference to the wavelength band of electromagnetic radiation to which that configuration filters incident electromagnetic radiation, for example by allowing transmission of that wavelength band through the filter assembly and preventing transmission through the filter assembly of wavelengths outside the wavelength band.

In preferred embodiments, the wavelength bands of adjacent configurations of the series overlap thereby to define differential sub-bands within the wavelength bands outside the regions of overlap.

In preferred embodiments, the wavelength bands of adjacent configurations are each partially overlapping the other.

In preferred embodiments, the measurement values for the sub-bands are derived by processing sensor measurements relating to each of the configurations of the series taking account of the overlaps between the wavelength bands of the different configurations.

It is to be noted that the terms 'series' and 'adjacent' in the above refer to wavelength-space such that adjacent configurations are configurations which have overlapping wavelength bands; they may or may not be structurally adjacent in the filter assembly. Furthermore, progressing through the series of configurations in sequence would entail sequentially progressing from one configuration to an adjacent configuration and monotonically increasing or decreasing a central wavelength of the wavelength band to which the filter assembly filters incident electromagnetic radiation. Nevertheless, it is not necessary in every embodiment to progress through the series in sequence when taking measurements; measurements can in some embodiments be made out of sequence.

In some embodiments, for each of a plurality of configurations of the series:

in the wavelength band of the configuration a first differential sub-band is additionally included and a second differential sub-band is optionally omitted, as compared to the wavelength band of an adjacent configuration;

the processor is configured to derive a measurement value for the first differential sub-band.

The plurality of configurations can include all configurations or all configurations except one or more reference configurations, wherein each of the one or more reference configurations has a wavelength band that relates only to a substantially spectrally-invariant background signal and/or is substantially zero.

In some embodiments, the processor is configured to derive a measurement value for the first differential sub-band using a process including determining a difference between a sensor measurement relating to the wavelength band of the configuration and a sensor measurement relating to the wavelength band of the adjacent configuration, and optionally adjusting for a measurement value relating to the second differential sub-band.

In some embodiments, the reconfigurable filter assembly is configured so that a sensor measurement relating to the wavelength band of a reference configuration in the series relates only to a substantially spectrally-invariant background signal and/or is substantially zero.

In some embodiments, the processor is configured to input sensor measurements relating to the series of configurations into a fitting process to determine measurement values for the sub-bands which fit with the sensor measurements, the fitting process incorporating details of the wavelength bands associated with the series of configurations.

In preferred embodiments, the reconfigurable filter assembly is configured to perform a measurement cycle including adopting every configuration of the series of configurations, although not necessarily in sequence.

In some embodiments, the reconfigurable filter assembly is configured to progress through the series of configurations in sequence.

In some embodiments, the reconfigurable filter assembly is continuously variable to form the series of configurations.

In this manner, the size of the differential sub-bands is variable and can be selected according to the criteria of the user, allowing the device to provide a selectively adjustable level of spectral detail.

In some embodiments, the reconfigurable filter assembly is reconfigurable to vary an optical interference effect in one or more filter media to form the series of configurations.

In some embodiments, the reconfigurable filter assembly is rotatable and/or slidable to vary the optical interference effect in the one or more filter media.

In some embodiments, the processor is configured to utilise sensor measurements relating to a first feature of electromagnetic radiation for different configurations of the series to derive measurement values relating to the first feature for the sub-bands.

In some embodiments, the first feature is selected from the group consisting of: intensity, time dependence, polarisation, spatial distribution, phase.

In some embodiments, the processor can also be configured to utilise sensor measurements relating to a second feature of electromagnetic radiation for different configurations of the series to derive measurement values relating to the second feature for the sub-bands. The second feature can be selected from the same group as the first feature.

It should be noted that the second feature can relate to the dimensions in which measurement values relating to the first feature are derived for the sub-bands. For example, the first feature can be time dependence and the second feature can be spatial distribution, such that the processor is configured to derive measurement values for the sub-bands relating to the spatial distribution of the time dependence of the electromagnetic radiation. Similarly, the first feature can be polarisation and the second feature can be spatial distribution, such that the processor is configured to derive measurement values for the sub-bands relating to the spatial distribution of the polarisation. In other embodiments, the first feature can be intensity and the second feature can be spatial distribution, such that the processor is configured to derive measurement values for the sub-bands relating to the spatial distribution of the intensity. In other embodiments, the first feature can be phase and the second feature can be spatial distribution, such that the processor is configured to derive measurement values for the sub-bands relating to the spatial distribution of the phase.

It should also be noted that the processor can be configured to derive measurement values for the sub-bands relating to third or further features in a similar way to the first and second features. The third and/or further features can relate to the dimensions in which measurement values relating to the first and second features are derived for the sub-bands. For example, the first feature can be polarisation, the second feature can be time dependence, and the third feature can be spatial distribution, such that the processor is configured to derive measurement values for the sub-bands relating to the spatial distribution of the time dependence of the polarisation.

In some embodiments, the device includes an electromagnetic radiation modulator configured to modulate electromagnetic radiation to provide pulses of electromagnetic radiation incident on a target area, wherein for each filter configuration the sensor is configured to sense a time decay for electromagnetic radiation reflected, scattered or emitted from the target area and filtered by the filter assembly.

In some embodiments, the processor is configured to derive measurement values for the sub-bands in respect of each of a plurality of pixels.

In some embodiments, the device is an imaging device and the sensor is an imaging sensor.

In some embodiments, the processor can be configured to perform the processing as recited in any of the sections above for each pixel of the plurality of pixels.

According to an aspect of the disclosure, there is provided a method as in claim 15.

According to an aspect of the disclosure, there is provided a method of measuring electromagnetic radiation, including:

changing the configuration of a reconfigurable filter assembly having a series of configurations, wherein each configuration of the series allows transmission of a different wavelength band through the filter assembly, the wavelength bands of adjacent configurations of the series overlapping thereby to define differential sub-bands;

for each of the series of configurations, measuring electromagnetic radiation that has passed through the reconfigurable filter assembly with a sensor;

utilising the sensor measurements to derive measurement values for the sub-bands.

Optional features of the method aspects above are set out in the dependent claims and/or are detailed below.

In some embodiments, for each of a plurality of configurations of the series:

in the wavelength band of the configuration a first differential sub-band is additionally included and optionally a second differential sub-band is omitted, as compared to the wavelength band of an adjacent configuration;

the method including deriving a measurement value for the first differential sub-band.

In some embodiments, the method includes deriving a measurement value for the first differential sub-band using a process including determining a difference between a sensor measurement relating to the wavelength band of the configuration and a sensor measurement relating to the wavelength band of the adjacent configuration, and optionally adjusting for a measurement value relating to the second differential sub-band.

In some embodiments, the method includes inputting sensor measurements relating to the series of configurations into a fitting process to determine measurement values for the sub-bands which fit with the sensor measurements, the fitting process incorporating details of the wavelength bands associated with the series of configurations.

In some embodiments, the method includes progressing through the series of configurations in sequence.

In some embodiments, the method includes, for different configurations of the series, measuring with the sensor a first feature of electromagnetic radiation that has been filtered by the filter assembly, and utilising the measurements of the first feature to derive measurement values relating to the first feature for the sub-bands.

In some embodiments, the first feature is selected from the group consisting of: intensity, time dependence, polarisation, spatial distribution, phase.

In some embodiments, the method includes, for different configurations of the series, also measuring with the sensor a second feature of electromagnetic radiation that has been filtered by the filter assembly, and utilising the measurements of the second feature to derive measurement values relating to the first feature for the sub-bands. The second feature can be selected from the same group as the first feature. The first and second features, and also possibly further features, can be as discussed above with respect to the system.

In some embodiments, the method includes modulating radiation incident on a target area into pulses;

wherein measuring with a sensor electromagnetic radiation that has been filtered by the reconfigurable filter assembly includes measuring with the sensor a time decay of electromagnetic radiation reflected, scattered or emitted from the target area and filtered by the filter assembly.

In some embodiments, the method includes deriving measurement values for the sub-bands in respect of each of a plurality of pixels.

According to an aspect of the disclosure, there is provided an executable program configured to perform the method recited above when executed on the device recited above.

According to an aspect of the disclosure, there is provided computer readable medium encoding the program.

The processor of the device can be programmed with the program.

BRIEF DESCRIPTION OF THE DRAWINGS

Embodiments of the disclosure are described in detail below, by way of example only, with reference to the accompanying drawings, in which:

FIGS. 1A-D illustrate conventional filter based hyperspectral imaging;

FIGS. 10A-D illustrate an embodiment of the disclosure;

DETAILED DESCRIPTION

FIGS. 1A-D show a conventional system for hyperspectral imaging using conventional filters.

Referring to FIGS. 1A-D, in simple terms, conventional filters sample the spectral domain in a limited way and cannot reproduce all features faithfully.

The principle of work of conventional optical bandpass filter based hyperspectral imaging is depicted in FIGS. 1A-D. Light from a scene contains photons of a mixture of wavelength (spectral information), an optical bandpass filter placed in front of this scene will transmit a range of wavelength according to the bandwidth of the filter. To transmit a different wavelength band the filter itself has to be changed or adjusted to transmit a separate passband.

Conventional tuneable filters, including thin-film dielectric filters, acousto-optic tuneable filters and liquid-crystal tuneable filters have a bandwidth greater than 3 nm, which determines the spectral resolution achieved in this scheme. The spectral resolutions in these systems are fixed by design, so cannot be changed to adapt the measurement to a scene with finer spectral details than the resolution. Measurements of the spectrum, which is the power of detected radiation as a function of wavelength, on these types of filters (c) will end up with a spectrum that is smoothed out (d), because the spectral averaging takes place over a wide wavelength band, limited by the design of the filters.

In contrast, as described below, in embodiments of the disclosure, a reconfigurable filter assembly is used which has a series of configurations with overlapping wavelength bands, and measurement values for differential sub-bands defined by the overlapping wavelength bands are derived to provide a greater level of spectral detail than is provided by the configurations in isolation. In particular, preferred embodiments are able to determine measurement values for differential sub-bands which are potentially much narrower than the wavelength bands possible for any individual configuration. This can provide high spectral resolution which can for example be useful in spectroscopy or in imaging for detecting a large number of specific conditions which give rise to specific narrow-band signals or signatures.

Embodiments of the disclosure can therefore provide hyperspectral imaging with a differential reconstruction algorithm. Embodiments of the disclosure can sample the spectral domain without limitation in resolution and can reproduce spectral features faithfully, without compromising on signal-to-noise.

Figure 2A:
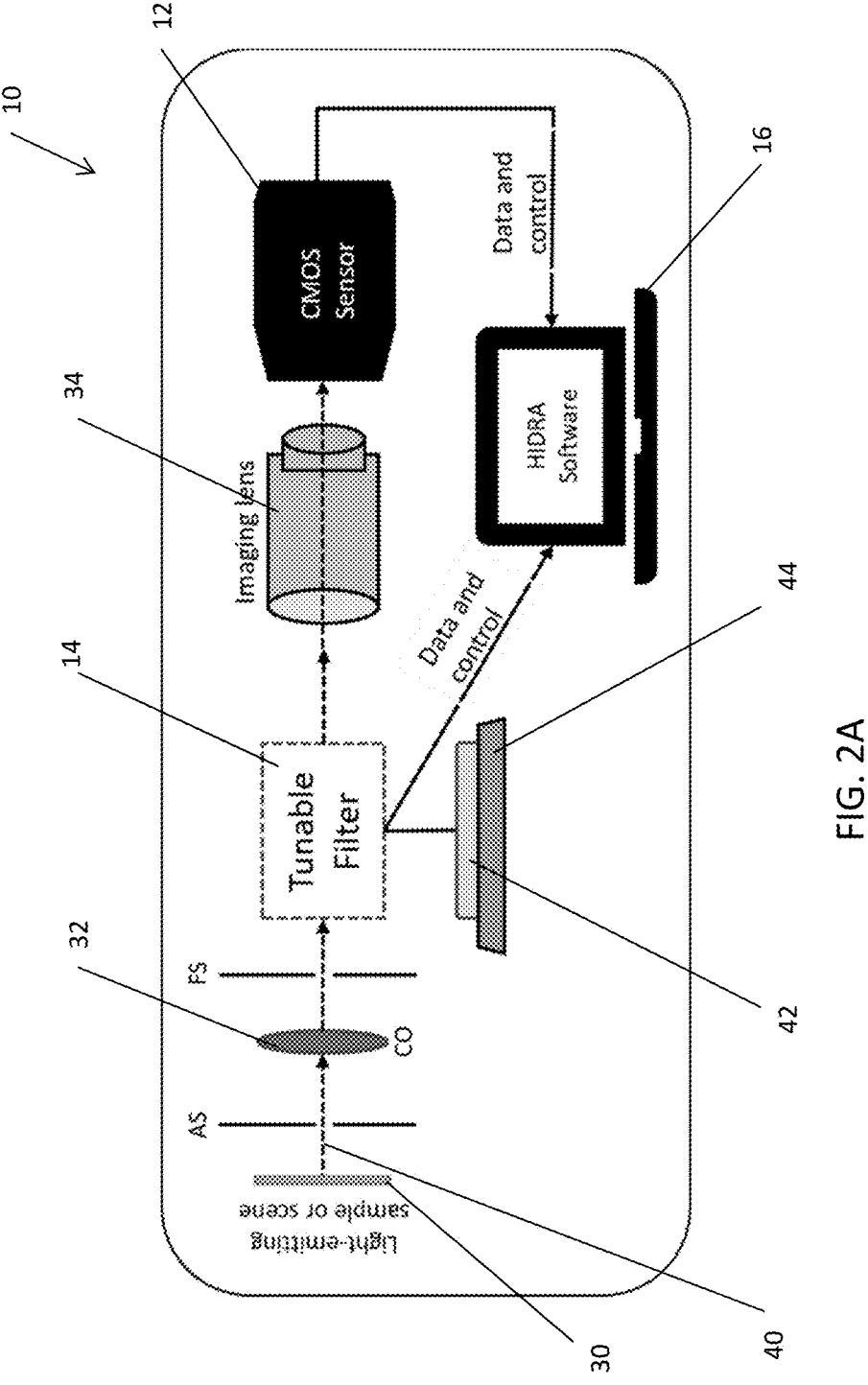
FIG. 2A is a schematic diagram of a device according to an embodiment of the disclosure.

In detail, an embodiment of the disclosure is described with respect to FIG. 2A.

FIG. 2A shows an electromagnetic radiation measurement device 10, including an electromagnetic radiation sensor 12, a reconfigurable filter assembly 14, and a processor 16. In this embodiment, the device 10 is an imaging device and the electromagnetic radiation sensor 12 is an imaging sensor, a spatially resolved detector, in this example a Complementary Metal-Oxide-Semiconductor (CMOS) sensor, configured to detect electromagnetic radiation for each of a plurality of pixels, although other sensors for example CCD, EMCCD can be used in other embodiments.

Figure 2B:
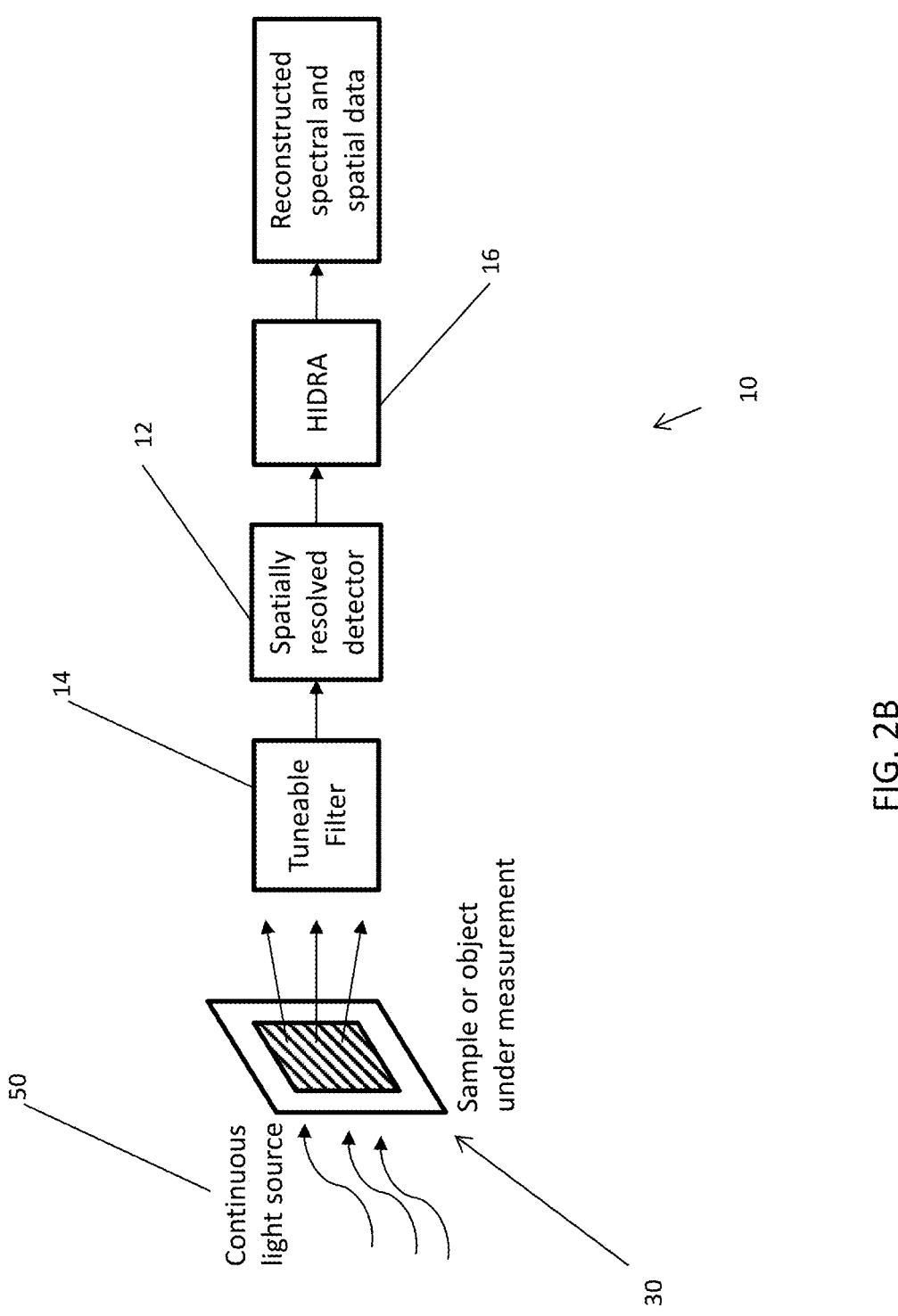
FIG. 2B is another schematic diagram showing the device of FIG. 2A.

A further schematic diagram of the device 10 is shown in FIG. 2B.

As can be seen, the device 10 includes in this embodiment a continuous light source 50 (not shown in FIG. 2A) to illuminate the target area. However, in some embodiments, the continuous light source can be ambient lighting on the target area 30; it does not need to be specific illumination from the device 10.

In this embodiment, the device 10 includes a collimating lens 32 (not shown in FIG. 2B) between a target area 30 and the reconfigurable filter arrangement 14. The target area 30 is of course not part of the device but refers to the area which in use will contain the scene, sample or object which the device is configured to measure or image. The scene, sample or object under measurement/imaging will generally be or include one or more features that absorb then re-emit incoming light, or that reflect or scatter the incoming light. The device 10 also includes an imaging lens 34 (not shown in FIG. 2B) between the reconfigurable filter arrangement 14 and the sensor 12. The lenses 32, 34 are configured such that light from the target area 30 passes along an optical axis 40 (not shown in FIG. 2B) through the collimating lens 32, the reconfigurable filter assembly 14, and the imaging lens 34 to be incident on the sensor 12 at an appropriate focus. However, as the skilled person will appreciate, various optical arrangements other than that shown in FIG. 2A can be implemented in order to focus light from the target area 30 on the sensor 12 having passed through the reconfigurable filter assembly 14 so as to be filtered in accordance with the teachings in this disclosure.

The reconfigurable filter assembly has a series of configurations, each configuration of the series allowing transmission of a different wavelength band through the filter assembly 14 to the sensor 12 for measuring by the sensor 12, thereby to filter to that wavelength band. The wavelength bands of adjacent configuration of the series overlap thereby to define differential sub-bands.

In this embodiment, the processor 16 is configured to control the reconfigurable filter arrangement 14 and the sensor 12 as well as to receive data therefrom in order to co-ordinate sensor measurements with the configurations of the reconfigurable filter arrangement 14. The processor can be programmed with an appropriate executable program to perform the functions recited herein.

The processor 16 is configured to utilise the sensor measurements for different configurations of the series to derive measurement values for the sub-bands for each of the plurality of pixels.

It should be noted that in this context, the terms "series" and "adjacent" refer to wavelength space such that adjacent configurations are configurations which have overlapping wavelength bands; they may or may not be structurally adjacent in the filter assembly 14. In other words, if one were to progress through the series of configurations in sequence, one would sequentially progress from one configuration to an adjacent configuration and monotonically increase or decrease a central wavelength of the wavelength band for which the filter assembly 14 allows transmission. However, as explained below, it is not actually necessary in every embodiment to progress through the series in sequence when taking measurements.

Figures 3A, 3B, 3C:
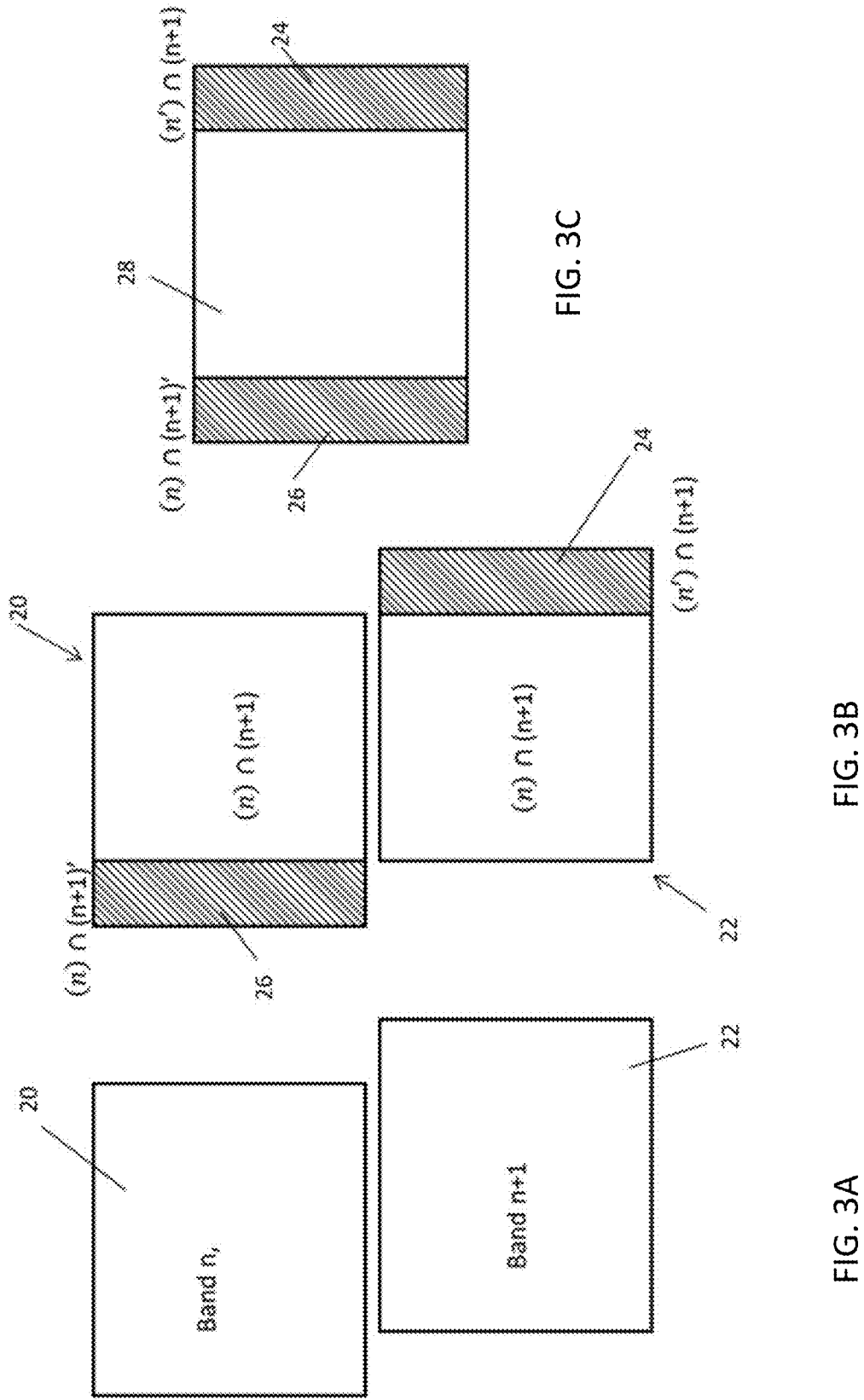
FIGS. 3A-C illustrate differential sub bands as used in the embodiment of FIG. 2A.

FIGS. 3A-C show in schematic form how the overlapping wavelength bands create the differential sub-bands.

FIG. 3A shows band n 20 and band (n+1) 21. n can take any value, such that band (n+1) 22 represents the wavelength band of any configuration of the series, and band n 20 represents the wavelength band of an adjacent configuration of lower central wavelength. It should be noted that in FIGS. 3A-C wavelength increases in the left to right direction such that the boundary wavelengths of bands 20 and 22 are slightly offset from each other. The vertical direction in FIGS. 3A-C is not significant.

In FIG. 3B, each of bands 20 and 22 are shown with a shaded region, representing a differential sub-band. In particular, in band 22, a first differential sub-band 24 is additionally included as compared to band 20, and a second differential sub-band 26 is omitted, such that the wavelength bands 20 and 22 are each partially overlapping the other. FIG. 3C shows the first and second differential sub-bands and the overlap region 28, the overlap region 28 representing the wavelengths that are included in both band 20 and band 22. As can be seen, the differential sub-bands 24, 26 of adjacent configurations are outside the region of overlap of those configurations.

Although in this embodiment, a second differential sub band 26 is omitted from band 22, this is not necessary in every embodiment. In some embodiments, it is possible for the wavelength band to continually grow as the series progresses, with each band adding a first differential sub-band but not omitting any wavelengths.

Returning to FIGS. 3A-C, as discussed below, in this embodiment, for each pixel, the measurement values for the differential sub-bands are derived by processing sensor measurements relating to each of the configurations of the series taking account of the overlaps between the wavelength bands of the different configurations.

In this embodiment, the reconfigurable filter assembly 14 is configured to perform a measurement cycle including adopting every configuration of the series of configurations. In particular, the reconfigurable filter assembly 14 is configured to progress through the series of configurations in sequence, although in other embodiments the measurement cycle can adopt the configurations in other orders.

For each configuration, the electromagnetic radiation sensor 12 is configured to take a sensor measurement for each pixel and to pass the sensor measurements to the processor 16. The processor 16 is configured to utilise these sensor measurements to derive measurement values for the differential sub-bands for each of the plurality of pixels.

In this embodiment, the processor 16 is configured to derive measurement values for the differential sub-bands using an analytical method as described below.

In this embodiment, the reconfigurable filter assembly 14 is configured so that a sensor measurement relating to the wavelength band of the first configuration in the series is considered to relate to a substantially spectrally-invariant background signal, which in this example is substantially zero. In other words, the initial band acts as background sampling band and the associated first filter configuration can be considered a reference configuration. As a result, there is effectively no reading associated with the first configuration, allowing differential sub-bands introduced in later configurations of the series to be determined analytically.

In other embodiments, the reference configuration (that has a wavelength band that is considered to relate to a substantially spectrally-invariant signal) does not need to be the first configuration, but can be any other configuration in the series. This would mean that there would be some constant offset in the measured spectrum, which could be acceptable in some applications.

In some embodiments, there can be more than one reference configuration.

In this embodiment, all of the differential sub-bands are of equal size and configured such that the second differential sub-band 26 of every configuration that does not overlap with the wavelength band of the reference configuration of the series corresponds to a first differential sub-band 24 of an earlier configuration in the series.

With reference again to FIGS. 3A-C, for each of a plurality of configurations of the series (in this embodiment the plurality being all of the configurations except the reference configuration), and for each pixel, the processor 16 is configured to derive a measurement value for the first differential sub-band using a process including determining a difference between the sensor measurement relating to the wavelength band of the configuration (in this case band 22) and the sensor measurement relating to the wavelength band of the adjacent configuration (in this case wavelength band 20) and where appropriate adjusting for the measurement value relating to the second differential sub-band 26. As will be apparent to the skilled person, taking the difference between bands 22 and 20 will provide the value for the first differential sub-band 24 reduced by the value of the second differential sub-band 26. Accordingly, where appropriate the calculation is adjusted for the measurement value of the second differential sub-band 26, in this case by adding it back in.

Where the second differential sub-band 26 relates to part of the wavelength band of the reference configuration, its value is known because the reference configuration related only to a spectrally invariant background signal, in this example zero. Where the second differential sub-band 26 was not part of the wavelength band of the reference configuration, it will have been previously calculated as the first differential sub-band of an earlier configuration of the series.

In other words, the first differential sub-band 24 is a difference between Image 2 and Image 1, and if Image 1 samples the background (i.e. ~0, then this band represents the area under the spectral curve and the wavelength value results from the inverse of the Riemann Sum)

The process is explained in more detail below with reference to FIGS. 4-7.

Figures 4, 7:
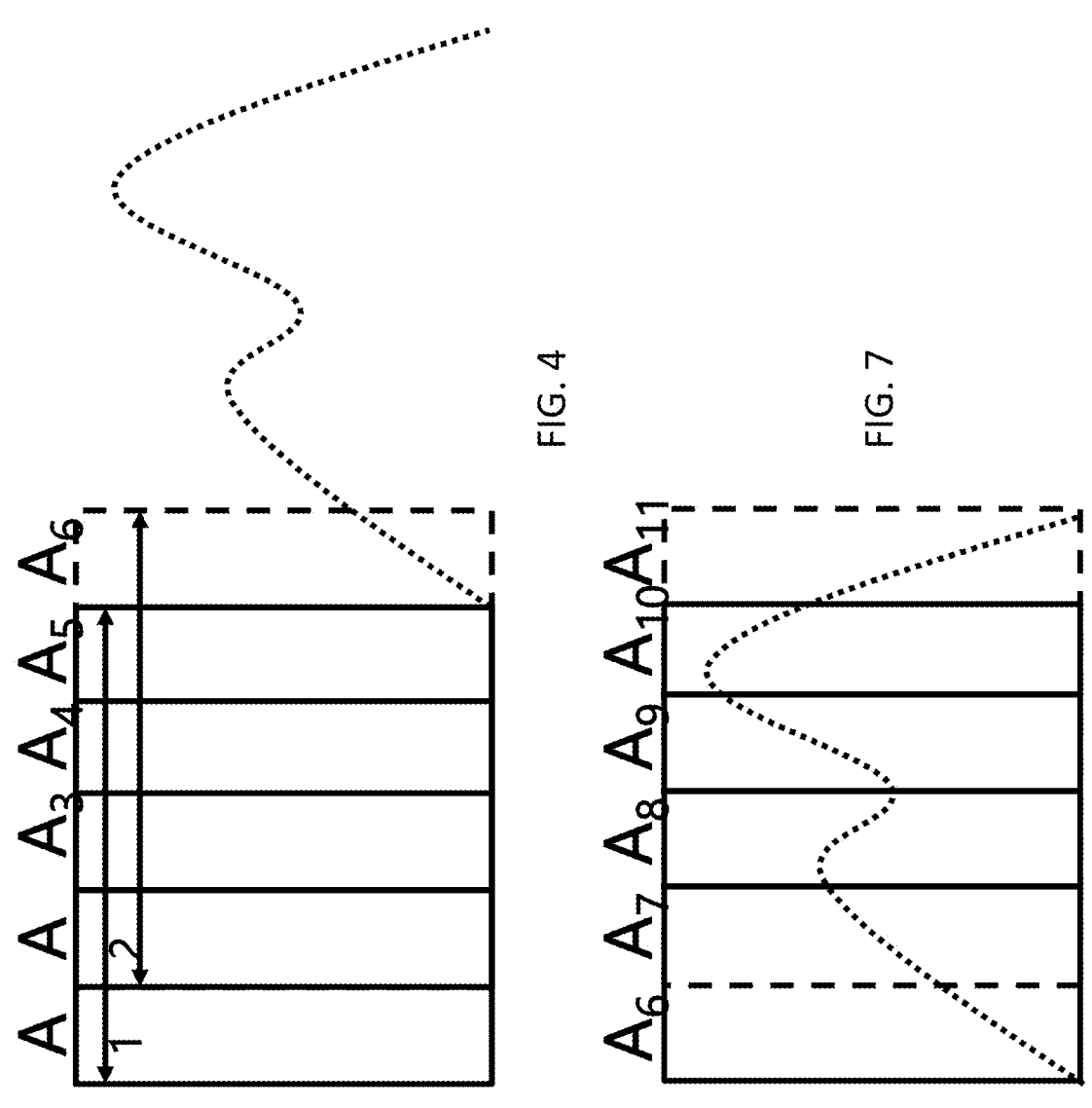
FIGS. 4 to 7 illustrate an analytical method for the embodiment of FIG. 2A.

FIG. 4 shows a plurality of differential sub-bands $A_1$ to $A_6$. $A_1$ to $A_6$ make up the wavelength band $I_1$ of the first configuration of the series, the reference configuration, which samples the background light and in this embodiment provides a zero reading. $A_2$ to $A_6$ make up the wavelength band $I_2$ of the second configuration of the series. In other words, $$I_1 = A_1 + A_2 + A_3 + A_4 + A_5$$

$$I_2 = A_2 + A_3 + A_4 + A_5 + A_6$$

$$I_2 - I_1 = A_6 - A_1 = A_6$$

$$\text{since } A_1 = 0$$

Figures 5, 6:
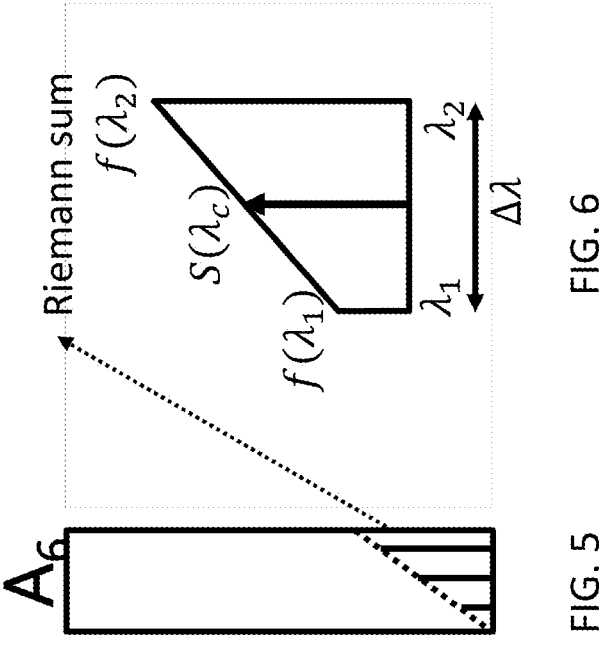

FIG. 5 shows $A_6$ in more detail. $A_6$ is the first differential sub-band of the second configuration and $A_1$ is the second differential sub-band of the second configuration. As can be seen $A_6$ has some readings of interest rather than just the background signal. The spectral intensity $S(\lambda_c)$ for $A_6$ can be calculated as follows:

$$I_2 - I_1 = A_6 - A_1 = A_6$$

$$A_6 = \frac{1}{2}[f(\lambda_1) + f(\lambda_2)] \times \Delta\lambda$$

-continued $$\frac{2A_6}{\Delta\lambda} = [f(\lambda_1) + f(\lambda_2)]$$

$$S(\lambda_c) = \frac{f(\lambda_1) + f(\lambda_2)}{2}$$

$$S(\lambda_c) = \frac{A_6}{\Delta\lambda}$$

where $\lambda_1$ and $\lambda_2$ are the boundary wavelengths of the differential sub-band $A_6$ and $\Delta - \lambda_2 - \lambda_1$ It can be seen that knowing the intensity of any "strip" allows the spectral intensity to be approximated in a simple division.

Moving on to differential sub-bands which do not overlap with the wavelength band of the reference configuration, reference is made to FIG. 7 in which $A_6$ to $A_{10}$ make up the wavelength band $I_6$ of the sixth configuration of the series, and $A_7$ to $A_{11}$ make up the wavelength band $I_7$ of the seventh configuration of the series.

The spectral intensity $S(\lambda_c)$ for $A_{11}$ can be calculated using similar logic as for $A_6$ except that the second differential sub-band (in this case $A_6$) is not zero. However, it has been derived as the first differential sub-band for the second configuration of the series.

Accordingly, for FIG. 7, $$I_6 = A_6 + A_7 + A_8 + A_9 + A_{10}$$

$$I_7 = A_7 + A_8 + A_9 + A_{10} + A_{11}$$

$$I_7 - I_6 = A_{11} - A_6$$

$$A_6 = I_2 - I_1$$

$$A_{11} = I_7 - I_6 + (I_2 - I_1)$$

$$S(\lambda_c) = \frac{A_{11}}{\Delta\lambda}$$

Corresponding logic can be applied to all later configurations of the series.

Reconstruction relies on the difference, e.g. $I_7$-$I_6$ between two adjacent configurations, taking this difference removes the overlapped region between $I_7$ and $I_6$, leaving the leading sub-band (the first differential sub-band 24) from $I_7$ with a positive contribution and a negative contribution from the trailing sub-band (the second differential sub-band 26) from $I_6$. The reconstruction has two parts. In the first part of the reconstruction, each and every negative sub-band (second differential sub-band 26) is pinned to the background value (effectively zero in this embodiment) as these sub-bands are part of the wavelength band of the reference configuration. This allows unique determination of the leading sub-bands (first differential sub-bands 24). In the second part of the reconstruction, negative contributions are no longer fixed at zero or at the background, but are each equal to a leading sub-band (first differential sub-band 24) which has been previously determined. They are now added back to the subtraction to allow the new leading sub-bands to be uniquely determined.

Accordingly, the spectral intensity $S_i(\lambda)$ for a first differential sub-band of an arbitrary configuration i can be calculated as follows. The index i here refers to the $i^{th}$ wavelength point, used in the reconstruction.

$$S_i\left(\lambda = \lambda_0 + \frac{W + (2(i - p)\Delta\lambda)}{2}\right) = \frac{I_i - I_{i-1}}{\Delta\lambda} + S_{i-p}$$

-continued $$p = \frac{W}{\Delta\lambda}, p \in \mathbb{Z}, i \in \mathbb{Z}$$

W is the full width half maximum (FWHM) of the filter passband $\Delta\lambda$ is the wavelength step In this way, spectral intensity can be determined for differential sub-bands which are potentially much narrower than the wavelength bands transmitted by any one of the configurations of the filter, allowing much greater spectral detail to be determined than can be measured directly with different filters.

It will be seen that in this embodiment of the analytical model, the derivation of the measurement values for the differential sub-bands is performed in order of increasing wavelength (although in other embodiments it can be done in order of decreasing wavelength, in which case it will be appreciated that the direction of increasing wavelength in FIGS. 3A-C would be reversed such that the first or 'leading' differential sub-band will be at the lower wavelength end of the wavelength band and the second or 'trailing' differential sub-band will be at the higher wavelength end of the wavelength band) irrespective of the order in which the reconfigurable filter assembly cycles through the different configurations.

Furthermore, where the reference configuration is not the first configuration of the series, derivation of the measurement values for the differential sub-bands for configurations with wavelength bands of wavelength greater than that of the reference configuration can be performed in order of increasing wavelength starting from the reference configuration, whereas derivation of the measurement values for the differential sub-bands for configurations with wavelength bands of wavelength less than that of the reference configuration can be performed in order of decreasing wavelength starting from the reference configuration.

In another embodiment of the disclosure, which is the same as the embodiment described above except as described below, measurement values for the differential sub-bands are derived using a numerical method rather than an analytical method.

An embodiment of the numerical method is described below.

Using the numerical method, the processor 16 is configured to input sensor measurements relating to the series of configurations into a fitting process to determine measurement values for the differential sub-bands which fit with the sensor measurements. The fitting process incorporates details of the wavelength bands associated with each of the configurations in the series of configurations and can thereby determine measurement values for the differential sub-bands which provide the best fit with the actual sensor measurements relating to the wavelength bands for each of the series of configurations.

Figure 8B:
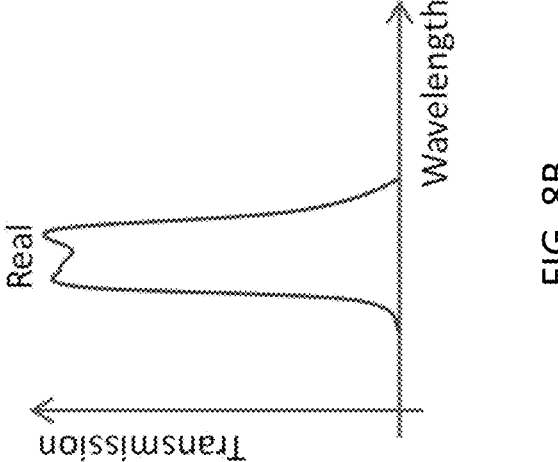
FIGS. 8A and 8B illustrate real and ideal transmission functions.
Figure 8A:
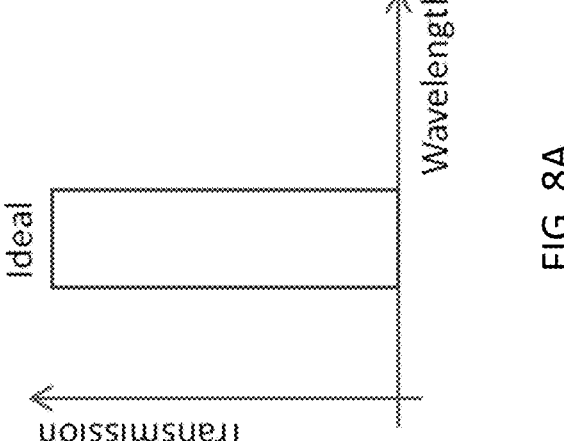

With reference to FIGS. 8A-B, real optical filters do not have ideal rectangular transmission bands, but a numerical fitting method can still be applied for reconstruction. FIG. 8A shows an ideal rectangular transmission band, whereas FIG. 8B shows an example of a real transmission band.

The reconfigurable filter assembly 14, when cycled through the series of configurations, can be considered as applying a matrix A, corresponding to a set of i distinct transmission filters (the i different configurations of the series where i is the number of configurations in the series)

to a measurand vector $x(\lambda)$, which corresponds with a light spectrum (intensity as a function of wavelength) to be detected.

The output is a vector I(i) corresponding with a set of light intensities recorded for the series of i measurements, and this is what is measured by the sensor 12.

In other words, for each pixel, the intensity is measured for each of the series of transmission bands corresponding to the different configurations.

This can be expressed as the following matrix equation:

$$[I_1 \; \ldots \; I_i] = [x_{\lambda_0} \; \ldots \; x_{\lambda_n}] \begin{bmatrix} A_{\lambda_{0,1}} & \cdots & A_{\lambda_{0,i}} \\ \vdots & \ddots & \vdots \\ A_{\lambda_{n,1}} & \cdots & A_{\lambda_{n,i}} \end{bmatrix}$$

In other words, each of the configurations has a transmission function $$\begin{bmatrix} A_{\lambda_0} \\ \vdots \\ A_{\lambda_n} \end{bmatrix}$$

where the differential sub-bands defined by the series of configurations are labelled $\lambda_j$ where j is from 0 to n. As such, for j=0 to n and k=1 to i, $A_{\lambda_{j,k}}$ in the above matrix equation represents a transmission coefficient of the differential sub-band $\lambda_j$ in the configuration k. $x_{\lambda_j}$ is the actual intensity value for the differential sub-band j which it is desired to measure.

Since the transmission spectra of the filter series of configurations (A) is known, and the output, in other words the sensor measurements for each of the configurations, (I) is measured, a fitting algorithm can be applied to approximate the measurand (x) by finding measurement values for the measurand (x) that provide the best fit to the output (I) in the matrix equation above.

Standard fitting algorithms and choices of initiation vector are suitable for this purpose.

In this way, spectral intensity can be determined for differential sub-bands which are potentially much narrower than the wavelength bands transmitted by any one of the configurations of the filter, allowing much greater spectral detail to be determined than can be measured directly with different filters.

It will be appreciated that the above analytical and numerical methods are performed for each of the plurality of pixels of the sensor 12 to derive the spectral intensity of the differential sub-bands for each one.

Figure 9:
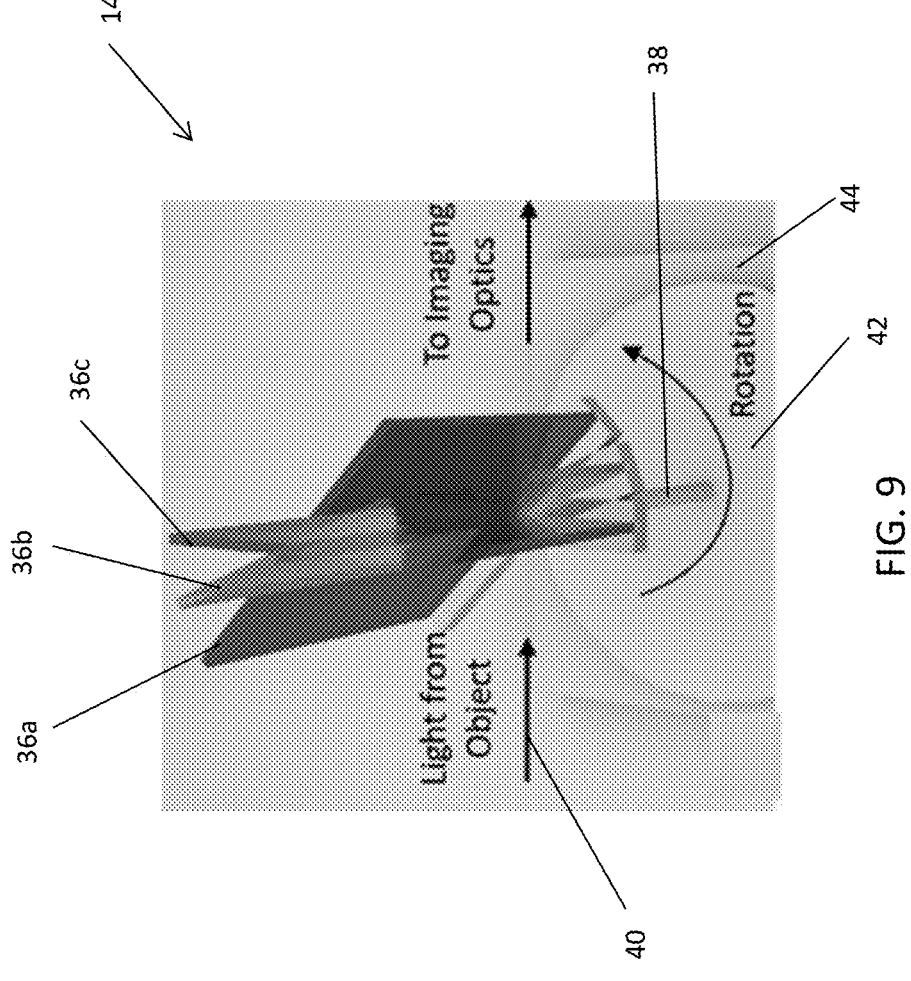
FIG. 9 shows the reconfigurable filter assembly of the embodiment of FIG. 2A.

Turning to the detail of the reconfigurable filter arrangement of the embodiment of FIG. 2A, the reconfigurable filter arrangement 14 is shown in detail in FIG. 9. In this embodiment, the reconfigurable filter assembly comprises a plurality of filter media 36. The filter media 36 are configured such that the transmission function depends on the optical interference effect in the filter media such that changing the angle of the filter media with respect to the optical axis 40 changes the transmission function and thereby changes the wavelength band transmitted.

In this embodiment, as can be seen in FIG. 9, the reconfigurable filter assembly 14 includes a first filter medium 36a, a second filter medium 36b, and a third filter medium 36c with different principal transmission functions, although more or fewer filter media can be used in other embodiments. As can be seen in FIG. 9, the first, second and third filter media are disposed at angles relative to each other and are all mounted on an axis of rotation 38, allowing the filter assembly 14 and in particular the filter media 36 to be rotated with respect to the optical axis 40.

Rotation of the axis 38 varies the angles of each of the filter media 36*a*, 36*b*, 36*c* with respect to the optical axis 40 and thereby changes the wavelength band transmitted by the filter assembly 14. Accordingly, the different configurations of the series can be different angles of rotation of the filter assembly 14. In other words, rotation of the axis 38, and thereby the reconfigurable filter assembly 14, varies the optical interference effect in each of the filter media 36*a*, 36*b*, 36*c*, and this can form different configurations of the series. The reconfigurable filter assembly 14 is thereby reconfigurable by rotation of the axis 38 to form the series of configurations.

The reconfigurable filter assembly 14, via the axis 38, is mounted on a rotation stage/mount 42, which in turn is mounted on a rotator base 44 which is configured to rotate the rotation stage/mount. The processor 16 is configured to control movement of the rotation stage 42 thereby to rotate the reconfigurable filter assembly 14 to cause it to adopt the different configurations in the series of configurations.

As can be appreciated, this provides for the reconfigurable filter assembly 14 to be continuously variable to form the series of configurations. The size of the differential sub-bands is variable and can be selected according to the criteria of the user, allowing the device to provide a selectively adjustable level of spectral detail. In this embodiment, the transmission band can be tuned precisely in steps of 1 nm, allowing the size of the differential sub-bands to be as small as about 1 nm or narrower.

As the skilled person will appreciate, the filter media in this embodiment are dichroic type filter media such that the transmission function depends on the optical interference effect in the filter media and rotation of the filter assembly 14 changes the optical interference effect.

Reference is now made to FIGS. 10A-D. As described above, the tunability of the filter arrangement comes from changing the angle of incidence by rotating the filter about its own axis. This changes the wavelength-dependence of the interference effect for the component, which changes the transmitted wavelength band (f). Although the absolute bandwidth of the filter at any angle is large (g), the relative differential bandwidth between two filter positions can be made arbitrarily narrow. It is this arbitrarily narrow relative differential bandwidth that is being scanned across a spectrum to reconstruct its features with high fidelity (h).

Nevertheless, although a particular filter arrangement has been described, in other embodiments, the reconfigurable filter assembly 14 can be replaced with any kind of tuneable filter assembly provided that the filter assembly is able to adopt a plurality of different configurations allowing filtering to different wavelength bands which overlap to define differential sub-bands as discussed in this disclosure. For example, in some embodiments, the reconfigurable filter assembly and/or the individual filter media are slidable to vary the optical interference effect in the one or more filter media in addition to or instead of being rotatable. Furthermore, although the filter assemblies described in detail herein generally use transmissive filters in which light passes through the filter, reflective filters in which light is filtered in reflection can be used in some embodiments. Indeed, any filter can be used, regardless of the spectral filtering mechanism, provided that it filters in accordance with the teachings disclosed herein. For example, for the analytical method discussed with reference to FIGS. 4 to 7, the configurations of the filter assembly preferably provide a bandpass filter with rectangular shape with step edge on both sides, or edgepass filter with step edge on one side.

With reference again to FIGS. 2A and 2B, an exemplary method of use of the device is described.

When it is desired to take a measurement of a target area 30, the sensor 12 is directed at the target area 30 through the reconfigurable filter assembly 14 such that light coming from the target area 30 passes through and is filtered by the reconfigurable filter assembly 14 and is incident on the sensor 12. The reconfigurable filter assembly 14 is operated to undertake the measurement cycle, thereby changing the configuration of the reconfigurable filter assembly and in turn adopting every configuration of the series of configurations as described above.

For each configuration adopted, the sensor 12 takes a sensor measurement, thereby measuring the electromagnetic radiation that has passed through and been filtered by the reconfigurable filter assembly. In this embodiment, each sensor measurement is taken for each of a plurality of pixels of a multi-pixel image.

The sensor measurements are passed to the processor 16, which uses the above described analytical or numerical method to derive, for each pixel, measurement values for each of the differential sub-bands encompassed by the wavelength bands of the series of configurations.

Embodiments of the disclosure can use any black and white camera sensor for the sensor 12 (for example any existing CMOS or CCD sensor without Bayer matrix) as the embodiments described convert it into a hyperspectral camera. Embodiments of the disclosure can be considered to change a 2D (two spatial dimensions) camera into a 3D (two spatial+one spectral dimension) camera. Embodiments can provide simultaneous spatial and spectral information from a scene.

Embodiments can do tuneable spectral resolution and can be implemented as a hyperspectral camera as well as a multispectral camera.

It is to be noted that the above embodiments do not rely on dispersive elements and use a single high transmission optical element. The optical element is an optical bandpass filter, its transmission band can be tuned precisely in steps of 1 nm. The resolution problem can be addressed without sacrificing the signal.

Embodiments of the disclosure can provide the following benefits:

1 nm (tuneable) or better spectral resolution

Novel non-dispersive spectral acquisition

Low-cost, low-power consumption

Small physical signature, e.g. mass

Adaptable to most existing imaging systems

Simultaneous high light-throughput and high spectral and spatial resolution

Embodiments can be applied to the following:

Quality inspection and control for manufacturing

Enable HSI on Mini-satellites e.g. CubeSat

Complement data collection on panchromatic imagers on larger satellites and airborne systems UAV mounted environmental monitoring.

Inspection of agricultural land use and crop health,

Healthcare and medical imaging (ophthalmology, blood oxygenation, cell tissue diagnostics etc)

Monitoring and analysis of food processing,

Chemical and biological imaging

Art fraud detection.

Forensic analysis.

Security

High accuracy data input for AI algorithms

Camera based monitor device for open surgery

Gas sensing in the IR

In the above embodiments, a continuous light source is used which is spectrally fixed. However, a light source which is reconfigurable spectrally can be used in some embodiments. If it is spectrally reconfigurable, a spatial-spectral data cube can be acquired for each configurable state of the light source, without changing the reconstruction algorithm. The sequence would be: 1. change light source configuration, 2. step through the filter assembly as discussed above 3. reconstruct data cube, 4. repeat.

It is also possible to use pulsed light rather than continuous light, for example from a pulsed light source or using a modulator, to increase the signal to noise ratio in a known manner.

In the above described embodiments, the device is an imaging device, the sensor is an imaging sensor, and the processor is configured to derive measurement values relating to intensity for the differential sub-bands in respect of each of a plurality of pixels. In other words, the methods described above for deriving the measurement value of the differential sub-bands are performed for each of a plurality of pixels. However, this is not necessary in every embodiment. In some embodiments the sensor/detector can be a single pixel detector. For example, in some embodiments, the device can operate like a spectrometer in which only a single measurement value is derived for each of the differential sub-bands.

In some embodiments, the teachings herein can be applied to any measurement system, where the sensor/detector provides some multiplex measurement of light. In the embodiment of FIG. 2A, spatial multiplexing is provided. However, other multiplexing can be provided in other embodiments, including but not limited to spatial, temporal, polarisation (with an in-line polarisation analyser).

For example, the sensor 12 can measure a first feature of light that has been filtered by the filter assembly 14, and the processor 16 can be configured to utilise sensor measurements relating to the first feature of light for different configurations of the series to derive measurement values relating to the first feature for the sub-bands. The first feature can be selected from the group consisting of: intensity, time dependence, polarisation, spatial distribution, phase. The sensor 12 can in some embodiments also measure further features of light that has been filtered by the filter assembly 14, those further features being selected from the same group as the first feature, and the processor 16 can be configured to utilise sensor measurements relating to those further features of light to derive measurement values relating to those further features for the sub-bands.

It should be noted that the further features can relate to the dimensions in which measurement values relating to the first feature are derived for the sub-bands. For example the first feature can be time dependence and a second feature can be spatial distribution, such that the processor is configured to derive measurement values for the sub-bands relating to the spatial distribution of the time dependence of the light. Similarly, the first feature can be polarisation and a second feature can be spatial distribution, such that the processor is configured to derive measurement values for the sub-bands relating to the spatial distribution of the polarisation. In other embodiments, the first feature can be intensity and a second feature can be spatial distribution, such that the processor is configured to derive measurement values for the sub-bands relating to the spatial distribution of the intensity. In other embodiments, the first feature can be phase and a second feature can be spatial distribution, such that the processor is configured to derive measurement values for the sub-bands relating to the spatial distribution of the phase. In other embodiments, the first feature can be polarisation, a second feature can be time dependence, and a third feature can be spatial distribution, such that the processor is configured to derive measurement values for the sub-bands relating to the spatial distribution of the time dependence of the polarisation.

Figure 11:
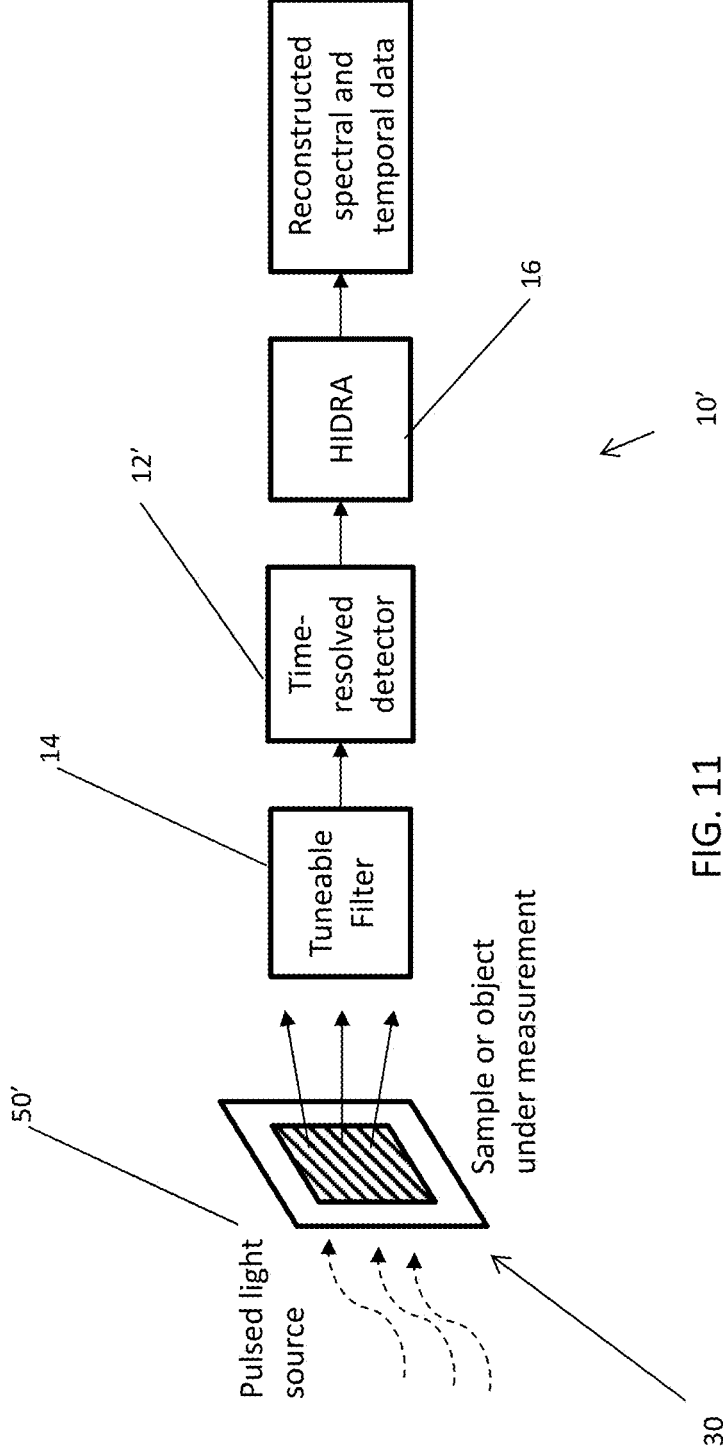
FIG. 11 a schematic diagram of an embodiment for temporal multiplexing.

Reference is made to FIG. 11, which is a schematic diagram of an embodiment for temporal multiplexing. This embodiment is the same as the embodiment of FIG. 2 except that the sensor 12' is a time-resolved detector and a pulsed light source 50' is used to illuminate the target area 30.

The time-resolved detector 12' is configured to collect the intensity decay for all the photons without separating into spectral channels.

The pulsed light source 50' is a form of light modulator in that it is configured to modulate light to provide pulses of light incident on the target area 30. The pulsed light source 50' is configured so that the pulses of light and measurements of the sensor 12' are timed in dependence on each other so as to measure a time decay of the light reflected, scattered or emitted from the target area and filtered by the filter assembly, for example using heterodyne or homodyne detection in a known manner.

The target area 30 may contain an object or sample that absorbs and then re-emits the incoming light, or reflects or scatters the incoming light.

For each configuration of the filter assembly, a set of decay curves is acquired by the detector 12' (2D array of digital numbers comprising relative intensity and the respective time-bin, each time-bin representing a period of time for which the light is measured and having a length corresponding to a temporal resolution of the system). In other words, the acquired data is a transient response per filter configuration.

The set of all decay curves for each and every filter configuration is passed to the processor 16 first to reshape the data to response per time-bin per filter configuration, and then to derive measurement values for the sub-bands using the analytical algorithm disclosed herein. It then produces a spectrum for each time-bin.

The data can then be analysed either as a spectrum per time-bin, or as a decay curve per spectral channel.

Figure 12:
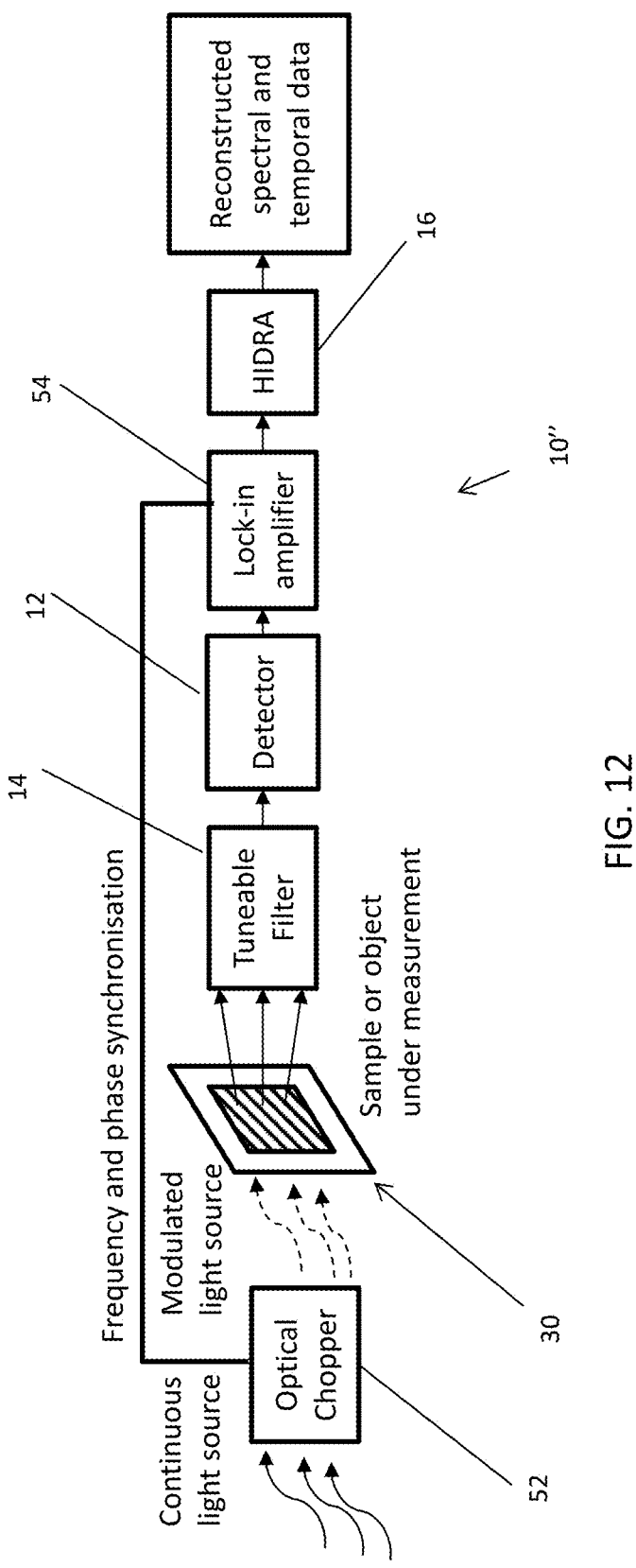
FIG. 12 is a schematic drawing of another embodiment that can be used for temporal multiplexing.

FIG. 12 is a schematic drawing of another embodiment that can be used for temporal multiplexing. The embodiment of FIG. 12 is the same as the embodiment of FIG. 11 except that in the embodiment of FIG. 12, a continuous light source is used and the light modulator is provided in the form of an optical chopper 52. The optical chopper is frequency and phase synchronised to a lock-in amplifier 54 and configured to modulate the light from the continuous light source to provide pulses of light incident on the target area 30 that enable measurement of a time decay of light reflected, scattered or emitted from the target area an filtered by the filter assembly, for example using heterodyne or homodyne detection as discussed above.

In this embodiment, the detector/sensor 12 does not need to be time-resolved but can be the same as for the embodiment of FIG. 2A.

The analysis is performed as for the embodiment of FIG. 11.

The embodiments of FIGS. 11 and 12 are described assuming a spectrally fixed light source. If a spectrally reconfigurable light source is used, the sequence is: 1. change the light source configuration, 2. change the filter configuration, 3. measure a signal in the appropriate time window to detect a time decay as discussed above, 4. repeat 2 and 3 until all filter configurations have been stepped through, 5. repeat 1 through 4 until all light source configurations have been stepped through.

In the embodiments of FIGS. 11 and 12, the time-resolved detection is performed for each of a plurality of pixels. In other words, the processor is configured to derive measurement values for the sub-bands relating to the spatial distribution of the time dependence of the light. However, as discussed above, in other embodiments this can be performed using a single pixel sensor/detector if the feature of the spatial distribution is not desired, and/or the feature of the time dependence of the light can be combined with other features of the light in the measurement.

In the above embodiments, the electromagnetic radiation is preferably light, although embodiments can encompass other regions of the electromagnetic spectrum in other embodiments.

All optional and preferred features and modifications of the described embodiments and dependent claims are usable in all aspects of the disclosure taught herein. Furthermore, the individual features of the dependent claims, as well as all optional and preferred features and modifications of the described embodiments are combinable and interchangeable with one another.

The invention claimed is:

1. An electromagnetic radiation measurement device, including:

an electromagnetic radiation sensor;

a reconfigurable filter assembly, the reconfigurable filter assembly having a series of configurations, each configuration of the series filtering to a different wavelength band for measuring by the sensor, the wavelength bands of adjacent configurations of the series overlapping thereby to define differential sub-bands; and a processor configured to utilise sensor measurements for different configurations of the series to derive measurement values for the sub-bands.

2. The device of claim 1, wherein, for each of a plurality of configurations of the series:

in the wavelength band of the configuration a first differential sub-band is additionally included and a second differential sub-band is optionally omitted, as compared to the wavelength band of an adjacent configuration; and the processor is configured to derive a measurement value for the first differential sub-band.

3. The device of claim 2, wherein the processor is configured to derive a measurement value for the first differential sub-band using a process including determining a difference between a sensor measurement relating to the wavelength band of the configuration and a sensor measurement relating to the wavelength band of the adjacent configuration, and optionally adjusting for a measurement value relating to the second differential sub-band.

4. The device of claim 3, wherein the reconfigurable filter assembly is configured so that a sensor measurement relating to the wavelength band of a reference configuration in the series relates only to a substantially spectrally-invariant background signal and/or is substantially zero.

5. The device of claim 1, wherein the processor is configured to input sensor measurements relating to the series of configurations into a fitting process to determine measurement values for the sub-bands which fit with the sensor measurements, the fitting process incorporating details of the wavelength bands associated with the series of configurations.

6. The device of claim 1, wherein the reconfigurable filter assembly is configured to progress through the series of configurations in sequence and/or is continuously variable to form the series of configurations.

7. The device of claim 1, wherein the reconfigurable filter assembly is reconfigurable to vary an optical interference effect in one or more filter media to form the series of configurations.

8. The device of claim 7, wherein the reconfigurable filter assembly is rotatable and/or slidable to vary the optical interference effect in the one or more filter media.

9. The device of claim 1, wherein the processor is configured to utilise sensor measurements relating to a first feature of electromagnetic radiation for different configurations of the series to derive measurement values relating to the first feature for the sub-bands; wherein optionally the first feature is selected from the group consisting of: intensity, time dependence, polarisation, spatial distribution, phase.

10. The device of claim 1, including an electromagnetic radiation modulator configured to modulate electromagnetic radiation to provide pulses of electromagnetic radiation incident on a target area, wherein for each filter configuration the sensor is configured to sense a time decay for electromagnetic radiation reflected, scattered or emitted from the target area and filtered by the filter assembly.

11. The device of claim 1, wherein the processor is configured to derive measurement values for the sub-bands in respect of each of a plurality of pixels; wherein optionally the device is an imaging device and the sensor is an imaging sensor.

12. A method of measuring electromagnetic radiation, including:

changing a configuration of a reconfigurable filter assembly having a series of configurations, wherein each configuration of the series filters to a different wavelength band, the wavelength bands of adjacent configurations of the series overlapping thereby to define differential sub-bands;

for each of the series of configurations, measuring with a sensor electromagnetic radiation that has been filtered by the reconfigurable filter assembly; and utilising the sensor measurements to derive measurement values for the sub-bands.

13. The method of claim 12, wherein, for each of a plurality of configurations of the series:

in the wavelength band of the configuration a first differential sub-band is additionally included and optionally a second differential sub-band is omitted, as compared to the wavelength band of an adjacent configuration; and the method including deriving a measurement value for the first differential sub-band.

14. The method of claim 13, including deriving a measurement value for the first differential sub-band using a process including determining a difference between a sensor measurement relating to the wavelength band of the configuration and a sensor measurement relating to the wavelength band of the adjacent configuration, and optionally adjusting for a measurement value relating to the second differential sub-band.

15. The method of claim 12, including inputting sensor measurements relating to the series of configurations into a fitting process to determine measurement values for the sub-bands which fit with the sensor measurements, the fitting process incorporating details of the wavelength bands associated with the series of configurations.

16. The method of claim 12, including progressing through the series of configurations in sequence.

17. The method of claim 12, including for different configurations of the series measuring with the sensor a first feature of electromagnetic radiation that has been filtered by the filter assembly, and utilising the measurements of the first feature to derive measurement values relating to the first feature for the sub-bands.

18. The method of claim 12, including modulating radiation incident on a target area into pulses;

wherein measuring with the sensor electromagnetic radiation that has been filtered by the reconfigurable filter assembly includes measuring with the sensor a time decay of electromagnetic radiation reflected, scattered or emitted from the target area and filtered by the filter assembly.

19. The method of claim 12, including deriving measurement values for the sub-bands in respect of each of a plurality of pixels.

20. An executable program configured to perform the method of claim 12 when executed on an electromagnetic radiation measurement device, wherein the electromagnetic radiation measurement includes:

an electromagnetic radiation sensor;

a reconfigurable filter assembly, the reconfigurable filter assembly having a series of configurations, each configuration of the series filtering to a different wavelength band for measuring by the sensor, the wavelength bands of adjacent configurations of the series overlapping thereby to define differential sub-bands; and a processor configured to utilise sensor measurements for different configurations of the series to derive measurement values for the sub-bands.

\* \* \* \* \*